Sept. 17, 1929.   K. BOHME ET AL   1,728,779
SWITCHING MECHANISM
Filed June 15, 1927

Inventors
Kurt Böhme and Karl Giese

Patented Sept. 17, 1929

1,728,779

UNITED STATES PATENT OFFICE

KURT BÖHME, OF BERLIN, AND KARL GIESE, OF POTSDAM, GERMANY, ASSIGNORS TO SIEMENS & HALSKE AKTIENGESELLSCHAFT, OF WERNERWERK, SIEMENSSTADT, NEAR BERLIN, GERMANY

SWITCHING MECHANISM

Application filed June 15, 1927, Serial No. 198,938, and in Germany September 10, 1926.

The invention relates to selectors for telephone systems, having contact wipers fixed to a longitudinally displaceable and rotatably mounted carrier furnished with vertical and rotary ratchet systems.

In such selectors the rotary ratchet must be moved along during the vertical motion of the wiper carrier. Therefore, the teeth of this system must either be so wide that the respective rotary pawls can act on the rotary ratchet in every vertical position of the wiper carrier, or else, when using teeth of ordinary size the pawls must be made suitably wide.

The invention is directed to a selector with wide teeth for the rotary system, so that pawls of ordinary size may be used, and the principal object of the invention resides in a particularly advantageous arrangement of this tooth system by locating the same as far as possible within the limits given by the length of the vertical ratchet. Thus the total height of both teeth systems is substantially reduced. This is of advantage in view of the question of space which must be considered a vital factor in the construction of this type of switches.

Other features of the invention consist in the special arrangement and shaping of the wiper carrier for obtaining certainty of working of the selector.

The invention will be described by way of an actual example, with reference to the accompanying single sheet of drawings showing Figs. 1 to 3, inclusive. Only those parts are shown in the drawings which are necessary for an understanding of the invention.

Figure 1:
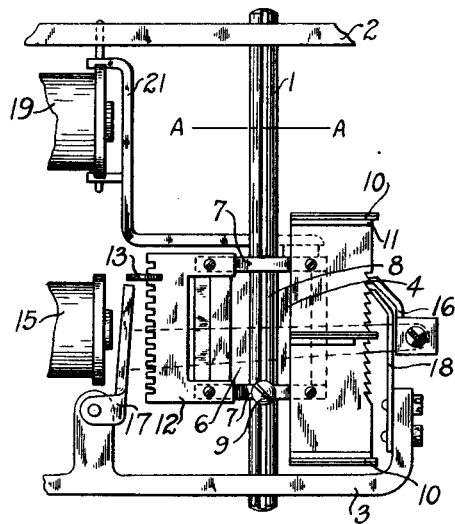
Fig. 1 is a front view of those parts of the selector, which are essential for an understanding, all unnecessary details having been omitted for the sake of simplicity.
Figure 3:
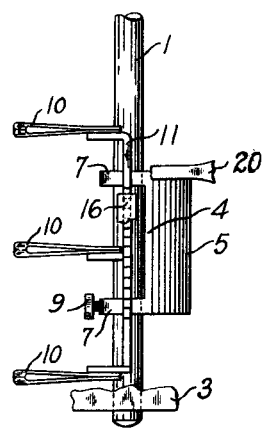
Fig. 3 shows these parts on the shaft as viewed from the side.
Figure 2:
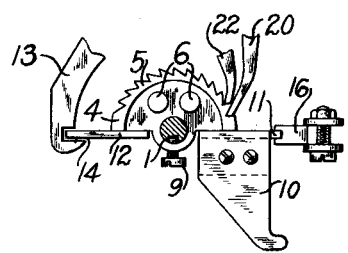
Fig. 2 is a plan of the selector shaft and the cooperating parts, as seen from line A—A in Fig. 1.

Reference numeral 1 denotes the selector shaft which is attached to the mounting plates 2 and 3. Arranged on the shaft 1 is a rotatable and longitudinally displaceable semicylindrical hub 4 having at its outer circumference teeth 5 covering its entire length. In order to reduce the weight of the hub, it is provided with several holes 6 which run in longitudinal direction. The hub is mounted on the shaft 1 at both ends. It is guided there by means of a longitudinal slit 8 provided in the shaft and a stud 9 on the lower bearing 7. The hub 4 carries at one side the rack 11 provided with wipers 10 and with teeth for lifting the hub, and at the other side, the hub 4 carries a rack 12 with a set of holding notches for engaging a segment 13 which is rigidly mounted to a portion of the selector so as to keep the lifted wiper carrier in the attained vertical position.

As the figures clearly show, the rotary ratchet of the wiper carrier is located within a space, whose height is defined by the vertical ratchet 11 or the wiper carrier, i. e., it does not protrude beyond this portion and therefore does not at all increase the overall height of the selector.

In the rest position of the selector, the holding notch-rack 12 is confined inside an excision 14 of the segment 13, so that the vertical motion of the wiper carrier is not impeded by the holding segment. The vertical displacement takes place by means of the magnet 15 and the pawl 16 provided on the armature 17. For the purpose of setting the wipers 10 vertically, the wiper support is lifted by a certain number of steps, and the vertical magnet is then disconnected. For further positioning the wipers 10, the wiper carrier is turned step by step by the rotary magnet 19 operating the pawl 20 which is mounted on the armature 21. Upon the first rotary step, one of the notches on the rack 12 will engage the segment 13 and keep the wiper support in its attained vertical position. The vertical teeth 11 are moved out of the range of the pawls 16 and 18. As the teeth 5 of the rotary ratchet extend over the entire length of the hub, the rotary pawl 20 and the detent 22 can act on these teeth in every vertical position of the wiper carrier and can rotate the latter. When the wipers 10, during the stepping displacement, make engagement with the selected stationary terminals of the bank, the rotary magnet is cut-off. The connection is then established. The arrangement of the stationary terminals in groups in horizontal rows or levels is well known and has been omitted in order to keep the drawings and the description as simple as possible.

The release of the wiper carrier to normal may be accomplished in any known manner, e. g. by further rotating the carrier to the last tooth of the rotary ratchet, whereupon the carrier slips from the segment 13 owing to its own weight, sliding into its lowest position on the shaft 1, and then returning to its starting position, say under the action of a spring which is tensed during the setting motion of the wiper carrier. Thus a complete quadrangular motion is executed.

What is claimed is:

1. In a switching mechanism, a shaft, a semi-circular member slidably mounted on said shaft, a wiper carrier rigidly attached to said member and laterally projecting therefrom, means on said carrier for moving said member along said shaft, and means on said member for rotating said carrier.

2. In a switching mechanism, a rotatable shaft, a semi-circular member slidably mounted on said shaft, a wiper carrier and a holding rack rigidly attached to said member on opposite sides and laterally projecting therefrom, said member, said carrier, and said rack forming a structural unit, means on said carrier for moving said unit along said shaft, and means on said member for rotating said unit.

3. In a switching mechanism, a rotatable shaft, a semi-circular member slidably mounted on said shaft, a wiper carrier and a holding rack rigidly attached to said member on opposite sides and laterally projecting therefrom, said member, said carrier, and said rack forming a structural unit, means on said carrier for moving said unit along said shaft, means on said member for rotating said unit, and means on said rack for maintaining the position of said unit with respect to said shaft during rotation.

4. In a switching mechanism, a rotatable shaft, a semi-circular member slidably mounted on said shaft, a wiper carrier and a holding rack rigidly attached to said member on opposite sides and laterally projecting therefrom, said member, said carrier, and said rack forming a structural unit, means on said carrier for moving said unit along said shaft, means on said member for rotating said unit, a holding segment accessible to said rack during rotation, and means on said rack for engaging said segment to maintain the position of said unit with respect to said shaft.

5. In a switching mechanism, a shaft, a semi-circular toothed member slidably mounted on said shaft, a wiper carrier provided with a ratchet, a holding bar provided with notches, said carrier and said bar being rigidly attached to said member, both projecting therefrom laterally on opposite sides and forming a structural unit with said member, means cooperating with said ratchet to move said unit along said shaft, means cooperating with said member for rotating said unit, and means cooperating with said notches during the rotation of said unit for maintaining the position of said unit with respect to said shaft.

6. In a switching mechanism, a shaft, a semi-circular hub slidably mounted on said shaft and provided with longitudinal teeth, a wiper carrier provided with a ratchet, a holding bar provided with notches, said carrier and said bar being rigidly mounted on opposite sides of said hub and forming a structural unit therewith, means cooperating with said ratchet to move said unit step by step along said shaft, means cooperating with said hub for rotating said unit step by step, and a segment cooperating with said bar during rotation, for retaining the position of said unit with respect to said shaft.

7. In a switching mechanism, a rotatable shaft, a wiper carrier consisting of a semi-circular hub slidably mounted on said shaft and provided with longitudinal teeth, two bars rigidly attached to said hub and laterally projecting therefrom on opposite sides, one of said bars being provided with a ratchet and the other bar being provided with notches, means cooperating with said ratchet for moving said carrier along said shaft, means cooperating with said hub for rotating said carrier, and a segment cooperating with said notches during rotation for maintaining the position of said carrier with respect to said shaft.

8. In a switching mechanism, a rotatable shaft, a rectangular wiper carrier slidably mounted on said shaft by means of a semi-circular hub, one side of said carrier provided with a ratchet for moving said carrier along said shaft, said hub provided with means for rotating said carrier, one side of said carrier, opposite said ratchet, provided with means for maintaining said carrier during rotation in position with respect to said shaft.

9. In a switching mechanism, a rotatable shaft, a rectangular wiper carrier, a semi-circular hub confined within the limits of said carrier for slidably mounting the same on said shaft, one side of said carrier disposed longitudinal to said shaft provided with a ratchet for moving said carrier along said shaft, said hub provided with a ratchet for rotating said carrier, and the other side of said carrier disposed longitudinal to said shaft provided with means for maintaining said carrier during rotation in position with respect to said shaft.

10. In a switching mechanism, a rotatable shaft, a rectangular wiper carrier, a semi-circular hub confined within the limits of said carrier for slidably mounting the same on said shaft, one side of said carrier disposed longitudinal to said shaft provided with a ratchet for moving said carrier along said shaft, said hub provided with a ratchet for rotating said carrier, the other side of said carrier disposed longitudinal to said shaft provided with notches, and means accessible to said notches during rotation for holding said carrier in position with respect to said shaft.

11. In a switching mechanism, a rotatable shaft, a rectangular wiper carrier, a semi-circular hub confined within the limits of said carrier and slidably mounted on said shaft, means on said carrier for moving the hub along said shaft, means on said hub for rotating the carrier, and means on said carrier for maintaining its position during rotation with respect to said shaft.

12. In a switching mechanism, a rotatable shaft, a rectangular wiper carrier slidably mounted on said shaft by means of a centrally located semi-circular hub, a first ratchet disposed on one side of said carrier longitudinal to said shaft for moving said carrier along said shaft, and a second ratchet provided on said hub for rotating said carrier.

13. In a switching mechanism, a rotatable shaft, a rectangular wiper carrier slidably mounted on said shaft by means of a centrally located semi-circular hub, a first ratchet disposed on one side of said carrier longitudinal to said shaft for moving said carrier along said shaft, a second ratchet provided on said hub for rotating said carrier, and notches provided on one side of said carrier opposite said first ratchet for mantaining said carrier during rotation in position with respect to said shaft.

14. In a switching mechanism, a rotatable shaft, a rectangular wiper carrier slidably mounted on said shaft by means of a centrally located semi-circular hub, a first ratchet disposed on one side of said carrier longitudinal to said shaft for moving said carrier along said shaft, a second ratchet provided on said hub for rotating said carrier, notches provided on said carrier opposite said first ratchet, and means accessible to said notches during rotation for maintaining said carrier in position with respect to said shaft.

In witness whereof, I hereunto subscribe my name this 11th day of May, A. D. 1927.

KURT BÖHME.

In witness whereof, I hereunto subscribe my name this 11th day of May, A. D. 1927.

KARL GIESE.